(12) United States Patent
Leadbeatter

(10) Patent No.: US 7,770,901 B2
(45) Date of Patent: Aug. 10, 2010

(54) CHUCK FOR ANGULAR OFFSET WOODTURNING

(75) Inventor: Bruce Robert Leadbeatter, Belmore (AU)

(73) Assignee: Napintas Pty. Ltd, Marrickville, New South Wales (AU)

( * ) Notice: Subject to any disclaimer, the term of this patent is extended or adjusted under 35 U.S.C. 154(b) by 1034 days.

(21) Appl. No.: 10/564,261

(22) PCT Filed: Jul. 14, 2004

(86) PCT No.: PCT/AU2004/000946

§ 371 (c)(1),
(2), (4) Date: Aug. 11, 2006

(87) PCT Pub. No.: WO2005/005113

PCT Pub. Date: Jan. 20, 2005

(65) Prior Publication Data

US 2007/0057474 A1      Mar. 15, 2007

(30) Foreign Application Priority Data

Jul. 14, 2003 (AU) .............................. 2003903604

(51) Int. Cl.
*B23B 31/24* (2006.01)
(52) U.S. Cl. ............... 279/132; 279/5; 279/6; 82/146; 142/55
(58) Field of Classification Search .......... 279/5, 279/6, 132, 133, 143; 142/48, 55, 57; 82/142, 82/146; *B23B 31/24*
See application file for complete search history.

(56) References Cited

U.S. PATENT DOCUMENTS

| 158,007 | A | * | 12/1874 | Toothaker | 279/6 |
| 375,011 | A | * | 12/1887 | Shaw | 279/6 |
| 1,745,525 | A | * | 2/1930 | Bissell | 408/98 |
| 3,962,937 | A | * | 6/1976 | Miller | 82/1.11 |
| 5,752,706 | A | | 5/1998 | Hodges | |
| 5,971,682 | A | * | 10/1999 | Vig | 409/234 |

FOREIGN PATENT DOCUMENTS

DE    1930870    12/1970
GB    2272656    5/1994

OTHER PUBLICATIONS

Jean-Francois Escoulen, Woodturning in France, May 1998, Editions Vial, Spain.
PCT International Search Report dated Jan. 2004.

* cited by examiner

*Primary Examiner*—Eric A Gates
(74) *Attorney, Agent, or Firm*—McCarter & English, LLP

(57) ABSTRACT

A chuck (1) for angular offset woodturning including a first member (2) adapted to be secured to a lathe, and a second member (3) adapted to support a work piece and secured to the first member in such that the second member is oriented with respect to the first member between at least two configurations. The first member having a first axis (4) coaxial with an axis of rotation of the lathe and the second member having a second axis (5), and in one of the configurations the second axis is coaxial with the first axis, and in the other configuration the second axis is angularly offset. The chuck further includes a releasable fastening member (12) incorporating alignment members allowing the second member to be secured in one of the two configurations and that in the other configuration the second axis lies relative to said first axis at one of a number of predetermined angular offsets.

8 Claims, 6 Drawing Sheets

CHUCK FOR ANGULAR OFFSET WOODTURNING

FIELD OF THE INVENTION

The present invention relates to a chuck for woodturning and in particular to a chuck capable of angular offset woodturning.

BACKGROUND OF THE INVENTION

"Cup chuck turning" is the expression used for the turning of wood articles such as goblets, spinning tops etc from a piece of wood. This activity usually involves forcing a taper-turned piece of wood into a cone shaped hole in a cup chuck or screwed into a cup chuck that has a special internal thread.

However, these types of cup chucks cannot be used to perform angular offset turning. There is however one cup chuck that has been developed with angular offset capability. This chuck was developed by Jean-Francois Escoulen and is described in the book, "Woodturning in France" (Editions Vial, Spain, May 1998, ISBN: 2-85101-063-8). This particular cup chuck comprises a cylindrical body for attachment to the headstock spindle of a lathe and a spherical ball that rotatably engages with a hollowed out section in the cylindrical body. The spherical ball can then be adjusted into a number of orientations with respect to the cylindrical body to achieve an angular offset. It achieves this by way of set screws that passes through a hole in the cylindrical body and can be screwed up against the spherical ball. The spherical ball includes an attachment means to secure a workpiece to itself and thus it can be used for angular offset woodturning.

This chuck however, does not afford discrete angular offset adjustments to the workpiece. This means that it is very difficult to return to a particular angular offset used previously. This deficiency means that it is difficult to replicate a previous work or to craft a work using one particular offset angle in multiple instances. Another deficiency results from the imprints the set screw produces on the spherical ball whilst tightening the screw there-against. These imprints roughen the surface of the spherical ball and make precision adjustments of the spherical ball with respect to the cylindrical body difficult.

The present invention seeks to provide a chuck for angular offset woodturning that will overcome or substantially ameliorate some of the deficiencies of the prior art.

SUMMARY OF THE INVENTION

According to a first aspect the present invention consists in a chuck for angular offset woodturning, said chuck comprising a first member adapted to be removably secured to a headstock spindle of a lathe, and a second member adapted to support a workpiece and removably secured to said first member in such a manner that said second member may be oriented with respect to said first member between at least two configurations, said first member having a first longitudinal axis substantially coaxial with an axis of rotation of said spindle and said second member having a second longitudinal axis, and in one of said configurations said second longitudinal axis is substantially coaxial with said first longitudinal axis, and in the or each other configuration said second longitudinal axis is angularly offset to said first longitudinal axis, and wherein said chuck further comprises releasable fastening means incorporating alignment members allowing said second member to be repeatedly secured in either one of said two configurations and that in said other configuration said second axis lies relative to said first axis at one of a limited number of predetermined angular offsets.

Preferably, said first member has a first engaging end with a first bore therein for engagement with said headstock spindle, and a first abutment end and said second member has a second engaging end with a second bore therein for engagement with said workpiece and a second abutment end adapted to abut and be removably secured to said first abutment end.

Preferably, said second bore includes a female thread adapted to cut into said workpiece for attachment of said workpiece to said second member.

Preferably, said first abutment end is angularly offset to the plane perpendicular to said first longitudinal axis by a predetermined angle and wherein said second abutment end, is also angularly offset to the plane perpendicular to said second longitudinal axis by said angle.

Preferably, said fastening means comprises a screw extending from the face of said first bore engagable with said second member.

Preferably, the abutment end of one of said workpiece support member or said lathe engaging member includes at least four concentric cavities and the axis of said screw passes through the centrepoint defined by said cavities and wherein the abutment end of the other member includes pins which are configured to engage with said cavities in such a way that while said pins are engaged with said cavities the orientation of said first member is fixed with respect to said second member.

Preferably, said at least two configurations are two or more configurations.

Preferably, said first member and said second member comprise indicia on their outside surfaces which indicate their orientation in relation to each other.

DESCRIPTION OF THE FIGURES

A preferred embodiment of the invention will now be described, by way of example only, with reference to the accompanying drawings in which:

FIG. 4 is a side view of the chuck in two configurations.

FIG. 6 are side views of two completed example workpieces as turned by the chuck.

DETAILED DESCRIPTION OF THE PREFERRED EMBODIMENTS

Figure 1:
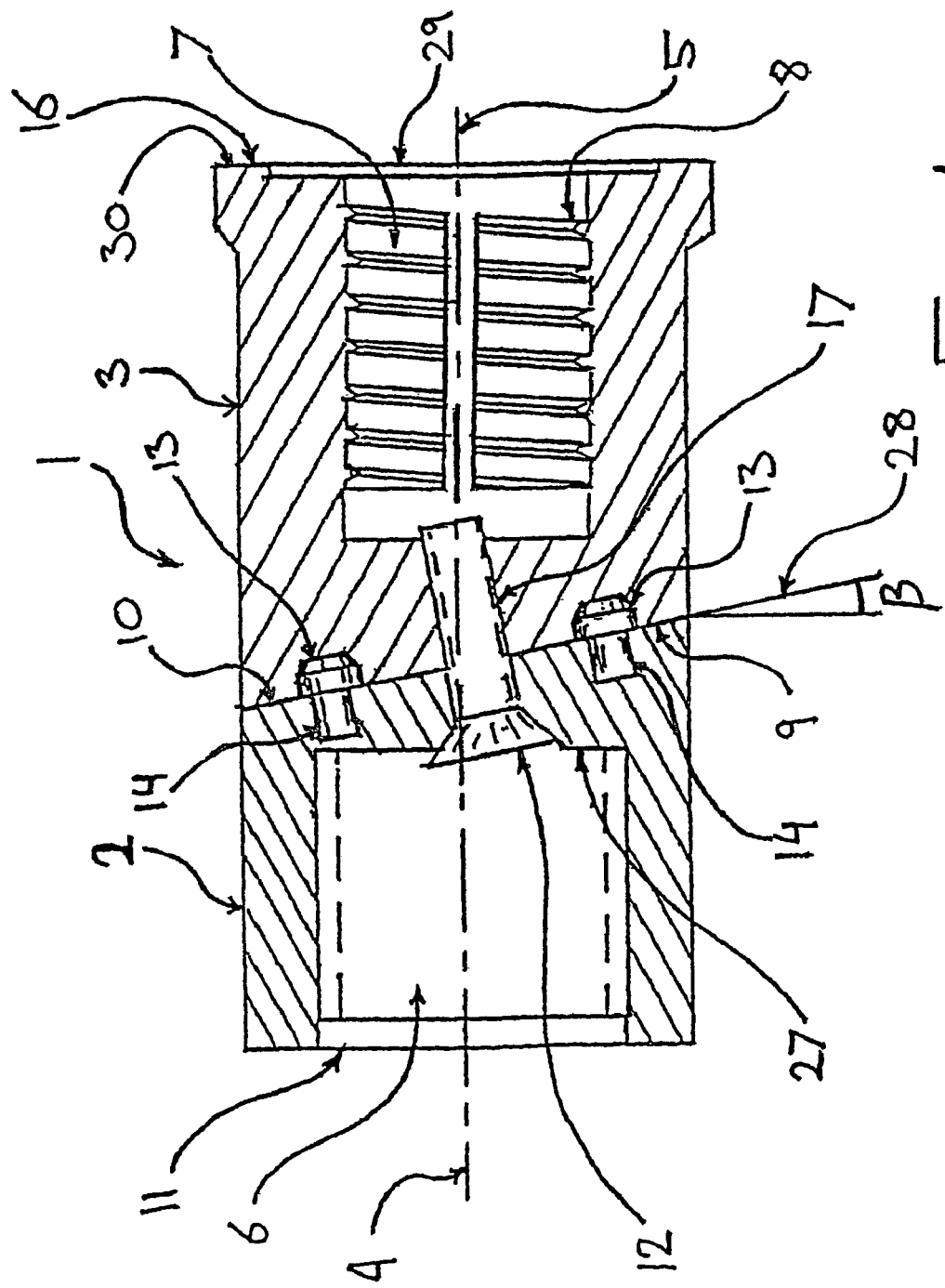
FIG. 1 is a cross-sectional view of the chuck in a first configuration in accordance with the first preferred embodiment.
Figure 2:
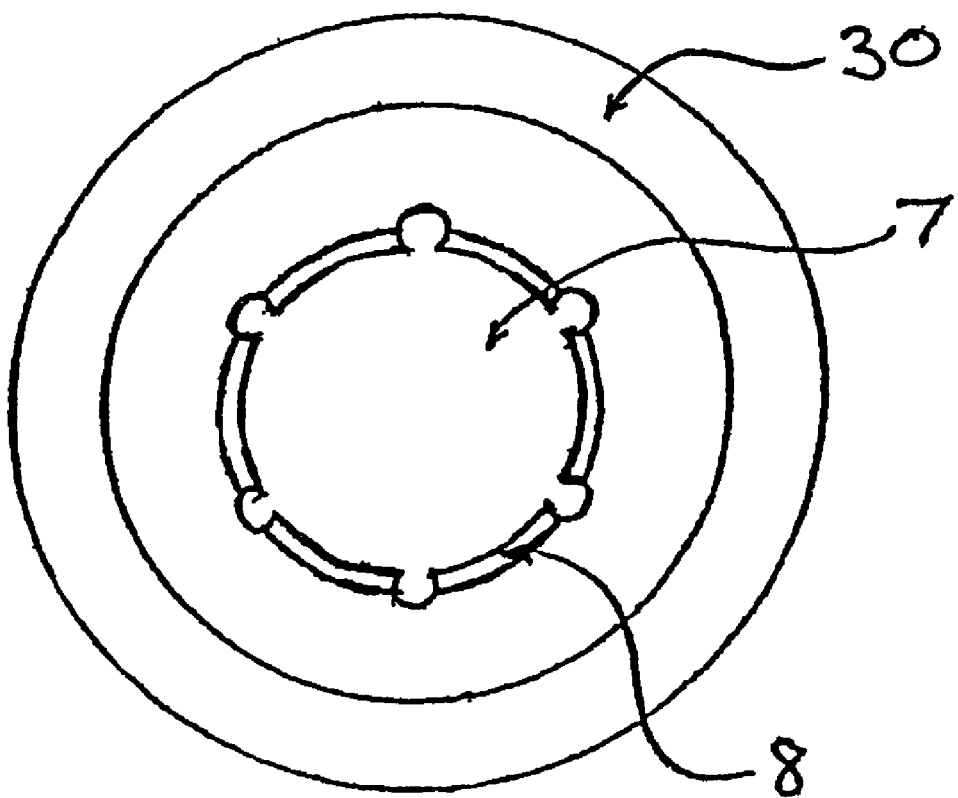
FIG. 2 is an end view of the chuck of FIG. 1.
Figure 3:
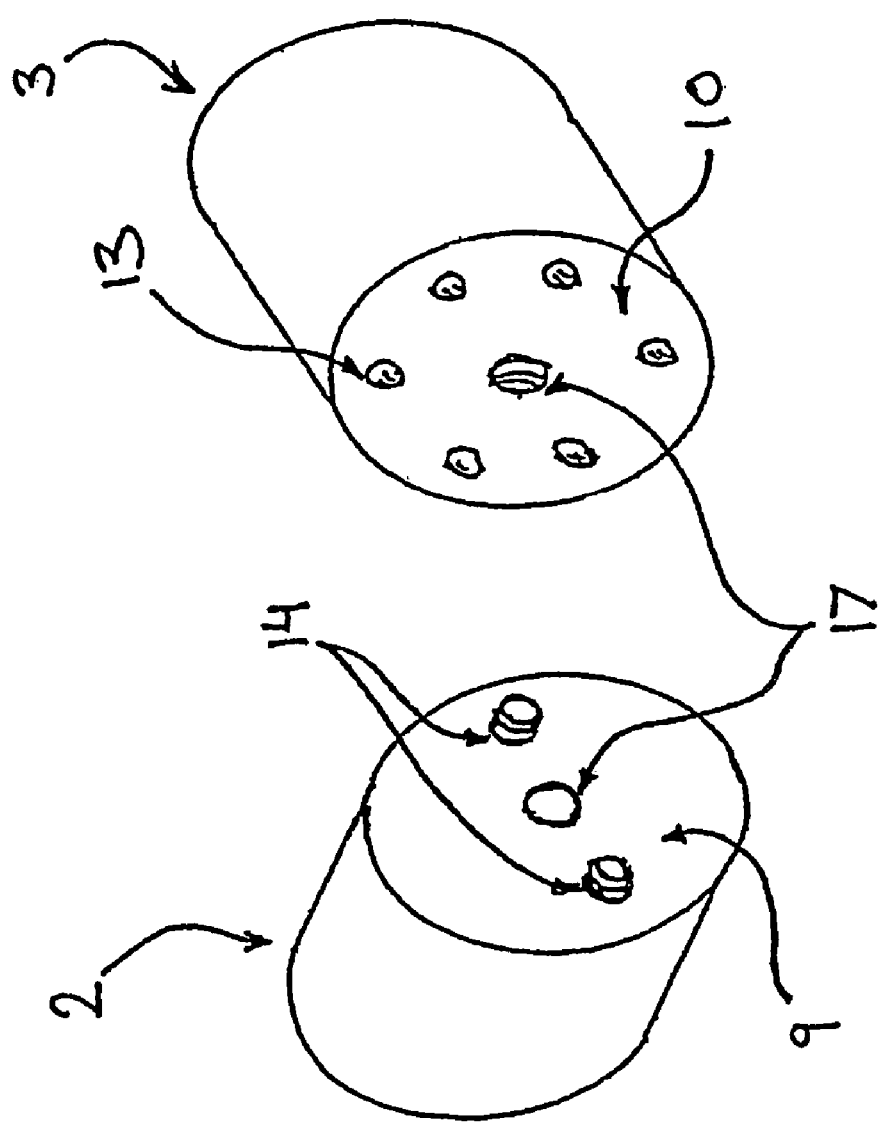
FIG. 3 is a perspective view of the lathe engaging member and workpiece support member showing the first abutment end and second abutment end respectively in accordance with the first preferred embodiment.

Referring to FIGS. 1-6b there is illustrated a chuck 1 for angular offset woodturning in accordance with a first embodiment of the present invention. Chuck 1 comprising a lathe engaging member 2, a workpiece support member 3 and a screw 12. The lathe engaging member 2 having a lathe longitudinal axis 4, a first abutment end 9 and a first engagement end 11 with a first bore 6 therein. The workpiece support member 3 having a workpiece longitudinal axis 5, a second abutment end 10 and a workpiece engagement end 16 with a second bore 7 therein.

In the configuration shown in FIG. 1, the lathe longitudinal axis 4 of the lathe engaging member 2 and the workpiece longitudinal axis 5 of the workpiece support member 3 are aligned, and the first abutment end 9 abuts against the second abutment end 10. The first bore 6 allows for the engagement of the lathe engaging member 2 with a headstock spindle of a lathe (not shown). The second bore 7 allows for the engagement of a workpiece 20 (see FIG. 5) with the workpiece support member 3. The second bore 7 includes a female thread 8 that cuts into the workpiece 20 to secure it to the workpiece support member 3.

The first and second abutment ends 9 and 10 are both angularly offset to a plane perpendicular to the longitudinal axes 4, 5 by an angle β. The screw 12 engages with a screw cavity 17 extending from a face 27 of the first bore 6 into the workpiece support member 3, and is aligned substantially perpendicular to the abutment plane 28 along which first and second abutment ends 9 and 10 meet.

The second abutment end 10 of the workpiece support member 3 includes six concentric cavities 13, and the first abutment end 9 of the lathe engaging member 2 includes two pins 14. The two pins 14 are configured to engage with an opposed pair of the cavities 13 in such a way, that while they are engaged the orientation of the lathe engaging member 2 is fixed with respect to the workpiece support member 3. The orientation of the lathe engaging member 2 with respect to the workpiece support member 3 can be adjusted by unscrewing the screw 12 and realigning the pair of pins 14 with a different opposed pair of the six cavities 13.

The workpiece support member 3 also incorporates a shallow bore 29 to reduce the area of contact between workpiece 20 and workpiece support member 3. This "reduced area of contact" is contact face 30. When workpiece 20 is fly screwed into bore 7 of workpiece support member 3, the contact face 30 allows grip on uneven or misaligned surfaces of workpiece 20. This grip is increased as the contact face 30 is located near the outside diameter (or periphery) of the end 16.

Figure 4B:
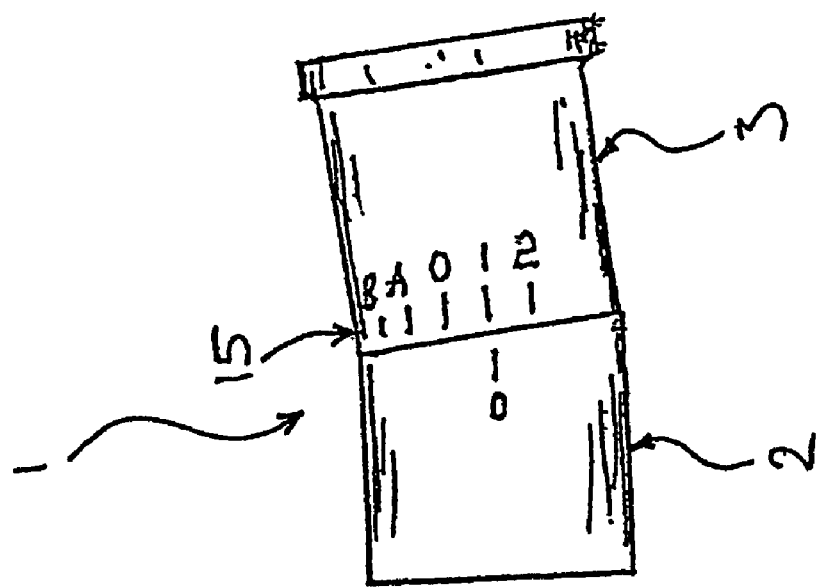
FIG. 4a is an aligned configuration and FIG. 4b is an angular offset configuration in accordance with the first preferred embodiment
Figure 4A:
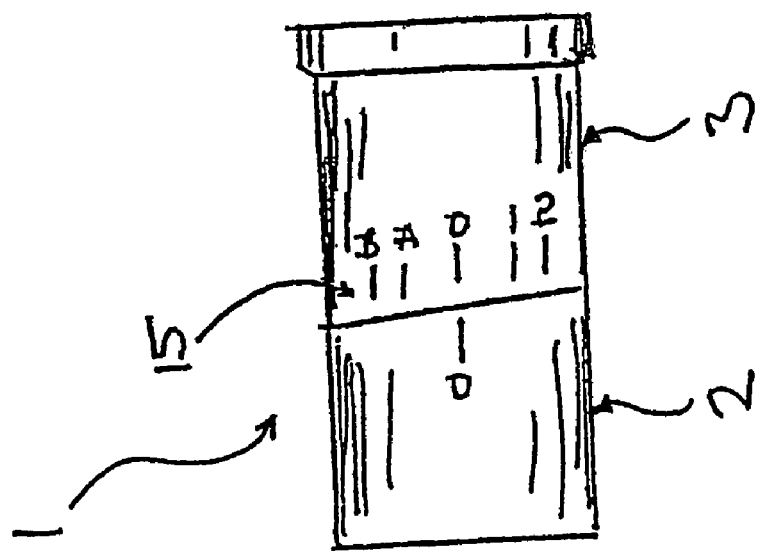

FIG. 4a depicts the chuck 1 in an aligned configuration similar to that shown in FIG. 1 and FIG. 4b depicts the chuck 1 in an angular offset configuration. A set of indicia 15 indicate the orientation of the lathe engaging member 2 with respect to the workpiece support member 3.

Figure 5:
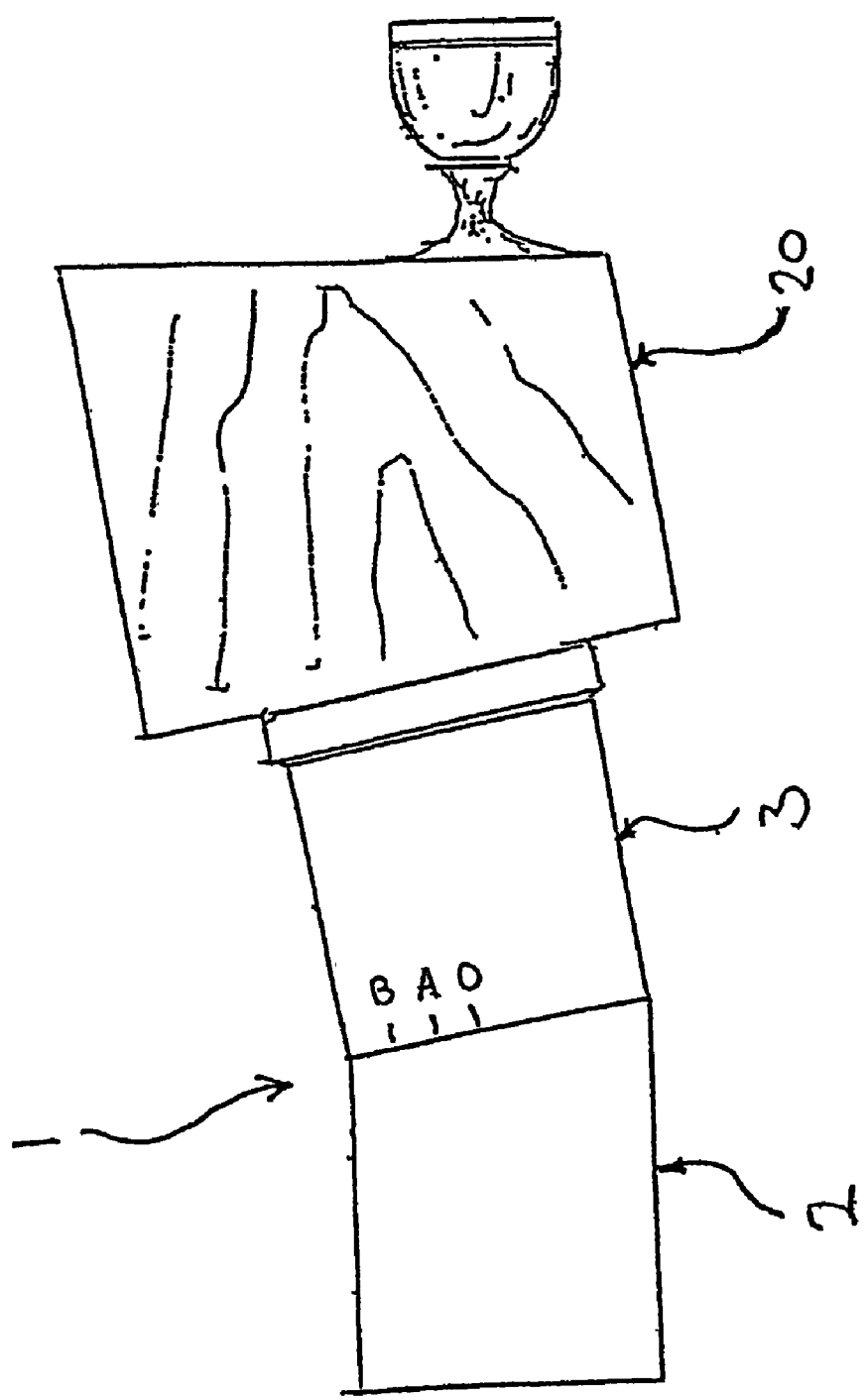
FIG. 5 is a side view of a workpiece attached to the chuck and being turned in accordance with the first preferred embodiment.

FIG. 5 depicts a workpiece 20 attached to the chuck 1 in an angular offset configuration and being turned.

Figure 6B:
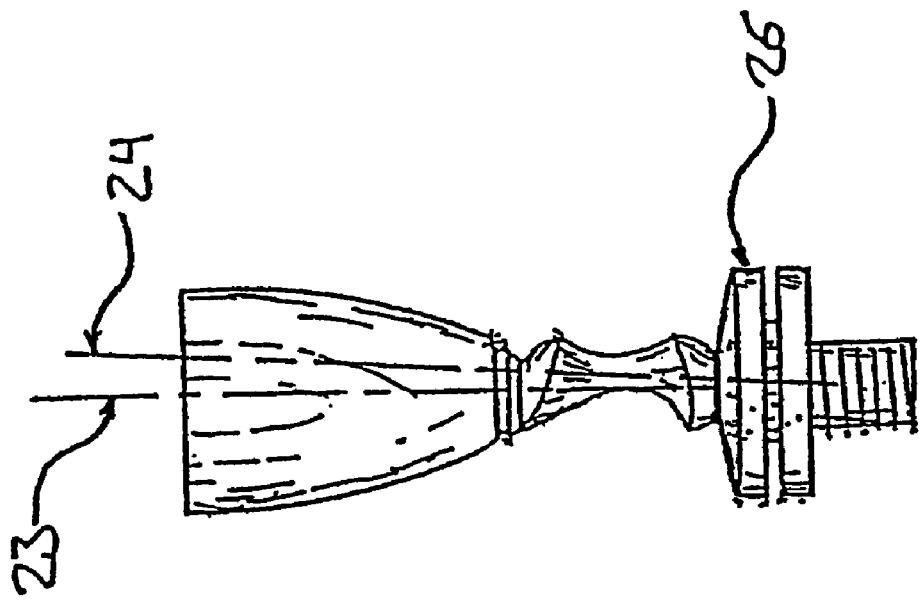
FIG. 6a is a first example workpiece and FIG. 6b is a second example workpiece in accordance with the first preferred embodiment.
Figure 6A:
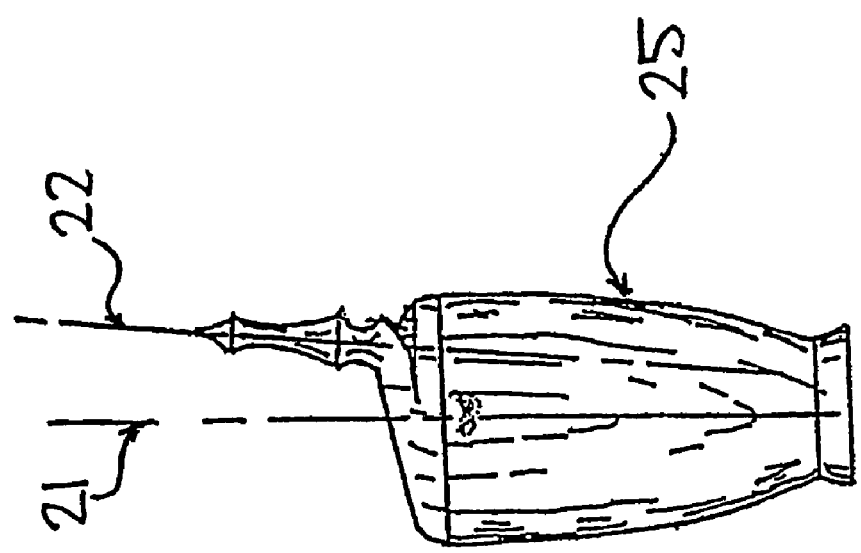

FIGS. 6a and 6b depict two example workpieces 25 and 26 that have been turned using the chuck 1. The workpiece 25 was turned using a first turning axis 21 and a second turning axis 22 angularly offset therefrom. The workpiece 26 was turned using a third turning axis 23 and a fourth tuning axis 24 angularly offset therefrom.

One of the advantages of this embodiment is that the workpiece support member 3 can be repeatedly aligned in any one of six discrete configurations with ease. Another advantage is that this alignment process does not cause damage to any of the components when the lathe engaging member 2 and the workpiece support member 3 are repeatedly reconfigured.

Another advantage is that the female thread 8 is a single start thread and thus the workpiece 20, when engaged with the workpiece support member 3, win always screw into the same position.

The foregoing describes only one preferred embodiment of the present invention and modifications, obvious to those skilled in the art, can be made thereto without departing from the scope of the present invention. For example, in another embodiment the screw 12 could be replaced by a bias means such that the chuck 1 could be adjusted by separating the workpiece support member 3 from the lathe engaging member 2, rotating the workpiece support member 3 so that the pins 14 are aligned with a different set of cavities 13 and then allowing the bias means to engage the lathe engaging member 2 and the workpiece support member 3, such that the cavities 13 seat the pins 14. It should be noted that the number of cavities 13 and pins 14 can also be varied, as long as the pins 14 can be aligned with the cavities 13 in various orientations.

The term "comprising" (and its grammatical variations) as used herein is used in the inclusive sense of "having" or "including" and not in the exclusive sense of "consisting only of".

The claims defining the invention are as follows:

1. A chuck for angular offset woodturning, said chuck comprising a first member adapted to be removably secured to a headstock spindle of a lathe, and a second member adapted to support a workpiece and removably secured to said first member in such a manner that said second member may be oriented with respect to said first member between at least two configurations, said first member having a first longitudinal axis substantially coaxial with an axis of rotation of said spindle and said second member having a second longitudinal axis, and in one of said configurations said second longitudinal axis is substantially coaxial with said first longitudinal axis, and in the or each other configuration said second longitudinal axis is angularly offset to said first longitudinal axis, and wherein said chuck further comprises a releasable fastening member incorporating alignment members allowing said second member to be repeatedly secured in any of said at least two configurations and that in said other configurations said second axis lies relative to said first axis at one of a limited number of predetermined angular offsets.

2. A chuck as claimed in claim 1, wherein said first member has a first engaging end with a first bore therein for engagement with said headstock spindle, and a first abutment end and said second member has a second engaging end with a second bore therein for engagement with said workpiece and a second abutment end adapted to abut and be removably secured to said first abutment end.

3. A chuck as claimed in claim 2, wherein said second bore includes a female thread adapted to cut into said workpiece for attachment of said workpiece to said second member.

4. A chuck as claimed in claim 2, wherein said first abutment end is angularly offset to the plane perpendicular to said first longitudinal axis by a predetermined angle and wherein said second abutment end is also angularly offset to the plane perpendicular to said second longitudinal axis by said angle.

5. A chuck as claimed in claim 2, wherein said fastening member comprises a screw extending from a face of said first bore engagable with said second member.

6. A chuck as claimed in claim 5, wherein the abutment end of one of said second member or said first member includes at least four concentric cavities and the axis of said screw passes through the centrepoint defined by said cavities and wherein the abutment end of the other member includes pins which are configured to engage with said cavities in such a way that while said pins are engaged with said cavities the orientation of said first member is fixed with respect to said second member.

7. A chuck as claimed in claim 1, wherein said at least two configurations are two or more configurations.

8. A chuck as claimed in claim 1, wherein said first member and said second member comprise indicia on their outside surfaces which indicate their orientation in relation to each other.

\* \* \* \* \*